United States Patent [19]
Glanz et al.

[11] 4,116,973
[45] Sep. 26, 1978

[54] THERMAL SENSITIVE MATERIALS

[75] Inventors: Kenneth D. Glanz, Appleton, Wis.; David B. McQuain, Dayton, Ohio

[73] Assignee: NCR Corporation, Dayton, Ohio

[21] Appl. No.: 684,213

[22] Filed: May 7, 1976

Related U.S. Application Data

[62] Division of Ser. No. 631,336, Nov. 12, 1975, Pat. No. 3,978,270.

[51] Int. Cl.$^2$ .................. C09B 7/02; C07D 209/42
[52] U.S. Cl. ........................................ 260/326.11 R
[58] Field of Search ............... 260/323, 320, 326.11 R

[56] References Cited
FOREIGN PATENT DOCUMENTS 16,377 of 1910 United Kingdom .................... 260/323

Primary Examiner—Ethel G. Love
Attorney, Agent, or Firm—J. T. Cavender; E. Frank McKinney

[57] ABSTRACT

Thermal sensitive indigo compounds are disclosed.

A thermal sensitive sheet material is disclosed utilizing dehydroindigo di(alkyl acylates) as a color producing component. The material can be a copy medium and it can be transparent or non-transparent.

The indigo compounds are substantially colorless dehydroindigo di(alkyl acylates) colorable by thermal exposure.

2 Claims, No Drawings

THERMAL SENSITIVE MATERIALS

This is a division of application Ser. No. 631,336, filed Nov. 12, 1975, now U.S. Pat. No. 3,978,270.

BACKGROUND OF THE INVENTION

1. Field of the Invention

This invention relates to substantially colorless, thermally colorable, indigo compounds. The compounds find use as color reactants in thermal sensitive materials.

The invention particularly relates to certain colorable dehydroindigo di(alkyl acylate) compounds and to their use in thermal sensitive marking materials.

This invention relates to thermal sensitive materials in film and sheet form, transparent and non-transparent. The invention more particularly relates to transparent marking materials incorporating colorable dehydroindigo di(alkyl acylate) compounds as a thermal sensitive color reactant. The invention more particularly relates to substantially opaque marking materials coated by dehydroindigo di(alkyl acylate) compounds.

The invention even more particularly relates to certain dehydroindigo di(alkyl acylate) compounds used in thermal coloration reactions in combination with certain color intensifying additives.

2. Description of the Prior Art

U.S. Pat. No. 3,666,525 discloses a heat sensitive copying sheet which utilizes a spiro compound and an organic sulfonic acid in a thermofusible material. A dispersion of the spiro compound, acid, and thermofusible material is coated onto a support material and marks are generated by application of sufficient heat to melt the thermofusible material and place the spiro compound and the acid in reactive contact.

U.S. Pat. No. 3,594,208 discloses a heat sensitive transparency sheet for light projection wherein two color-reactant components are individually coated onto a substrate carrier using different polymeric binder materials. Solvents are selected to eliminate reactive contact of the components during coating operations.

U.S. Pat. No. 3,914,510 issued Oct. 21, 1975 discloses a heat sensitive transparency sheet having individual color reactant layers including a base layer of binder and acid reactant and a surface coating of binder and chromogen. The binder of the base layer is hardened by crosslinking to improve qualities of the transparency.

SUMMARY OF THE INVENTION

Thermal sensitive record materials are known in the art. Typically, colorless mark-forming components such as crystal violet lactone and a phenolic material are arranged in juxtaposition in a single support sheet. Application of heat to the sheet causes a migration of liquefied or vaporized material to a juxtaposed mark-forming component to produce a mark, as the mark-forming components generally react upon contact to produce a color. Often, these known thermal sensitive copy sheets prematurely color before or without the application of heat. Another problem is the development of color in areas of the sheet where heat for marking is not applied.

Once colored, some heat sensitive record materials of the prior art fade or undergo an alteration in the developed hue. A fog or haze sometimes forms on heat sensitive record materials of the prior art.

A thermal sensitive material has now been developed which exhibits greatly improved stability. Underdeveloped or uncolored areas remain uncolored until heat is supplied to the area in greater than a certain threshold amount. Colored areas remain unfaded with constant hue. Sheets of the material do not become hazy in humid or otherwise adverse storage conditions.

The thermal sensitive material of this invention utilizes dehydroindigo di(alkyl acylate) material as the primary color former. The dehydroindigo di(alkyl acylate) material is used as the sole color former and it is used in combination with additive, intensifying, compounds.

The material of this invention is transparent or not and may be in a single layer form or it may involve a construction having more than one layer.

Accordingly, it is an object of this invention to provide a thermal sensitive dehydroindigo di(alkyl acylate) material.

It is an object of this invention to provide a thermal sensitive recording material having stable colored and uncolored states. It is, further, an object of this invention to provide a thermal sensitive sheet material utilizing dehydroindigo di(alkyl acylates). It is, further, an object of this invention to provide a thermal sensitive material utilizing dehydroindigo di(alkyl acylates) and additive, intensifying, compounds.

In accordance with the present invention, there is provided a dehydroindigo di(alkyl acylate) having the following structure wherein R is alkyl acylate having three to nine carbon atoms:

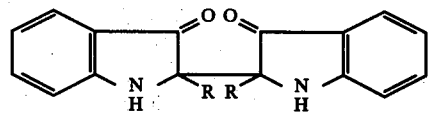

and there is provided a thermal sensitive material comprising a substrate and a dehydroindigo di(alkyl acylate) associated therewith.

The substrate serves as a carrier for color forming compounds and associated additive compounds. The substrate can include color forming and additive compounds within the body of the substrate or such compounds can be present in at least one layer on the substrate. The substrate can be thick or thin, flexible or not, and transparent, opaque or in gradations thereof. The usual substrate is flexible and has a thickness of about 0.005 to 0.50, preferably 0.01 to 0.25 millimeters. Transparent and non-transparent substrates are equally eligible; and layered combinations of transparent and non-transparent materials are used.

Non-transparent substrates include non-woven fibrous materials such as papers, spun-bonded synthetic polymeric sheets, and the like; woven fibrous materials such as cloth of natural or synthetic polymeric sources; pigmented or otherwise opacified polymeric webs of cast or extruded sources; and layered combinations thereof.

Transparent substrates can vary widely and are generally synthetic polymeric materials, cast or extruded, exemplified by the following: cellulosics such as ethylcellulose, cellulose acetate, nitrocellulose, and cellulose acetate butyrate; polystyrene; polyvinylacetate; polyvinylchloride; polyvinylidene chloride; polyalkylacrylates, methacrylates, ethacrylates, and the like, such as polymethylmethacrylate and polybutylmethacrylate; polyacrylonitriles; polycarbonates; polyethylenes; polypropylenes; polyethylene terephthalates; copolymers of the above; and the like. Although water soluble polymeric materials are eligible, preferred materials are insoluble in water.

Binder is a polymeric material which holds the color forming and additive compounds in location on or in the thermal sensitive material. The binder can be the same polymeric materials as are used for the substrate. In the case of a single layer construction, the color forming and additive compounds are distributed and bound in the single layer. When the substrate of the single layer is fibrous, the binder can be a polymeric impregnant for the substrate fibers and the color forming and additive compounds. The substrate can also be a synthetic polymeric material which binds the color forming and additive compounds; and, in that case, the binder is the substrate.

The binder can be water soluble or not and need not be thermoplastic. The color forming compounds of this invention generate color spontaneously in the presence of adequate thermal energy and, therefore, are not required to be bound in a fusible matrix for reactive, color-forming, contact with another material. When a combination of color forming compounds and intensifying compounds are present in undissolved form, a thermofusible binder is helpful in obtaining contact between the compounds. When either or both of the compounds are molecularly dispersed in the binder, however, compound contact is achieved without melting the binder.

In addition to the materials listed above as eligible substrate materials, binder can also be materials such as polyvinyl alcohol, gelatin, polyvinyl butyral, and the like.

Binder is generally added to substrates as a liquid solution or dispersion of polymeric material and some combination of color former or additive or both. The binder system can be absorbed into the substrate to yield a single layer recording material or the binder can be coated onto the substrate to yield an additional layer. When desired or required for some particular purpose, color former and additives such as intensifier, can be present in individual layers.

Intensifiers are sulfonic acids and phenols which aid in the heat development of color in the thermal sensitive material of this invention. Intensifiers increase the sensitivity of color formers by providing an acid environment more conducive to dehydroindigo di(alkyl acylate) color formation. Moreover, the use of intensifiers permits color formation at a considerably reduced temperature when compared with the temperature of color formation using color former alone.

Intensifiers often cause color formers to develop a hue different from the hue of a color former developed alone. As previously mentioned, the intensifiers can be dissolved (molecularly dispersed) in the binder system along with the color former or can be dispersed therein undissolved or can be located in an adjacent, contacting layer. When intensifier and color former are molecularly dispersed together, there is sometimes a light, preliminary, hue developed. The preliminary hue is usually in high contrast with the thermally developed color and reasons for the existence and formation of the preliminary hue are not well understood.

Intensifiers have been found to be useful in any small amount. To the extent that an intensifier is present, benefit from intensifiers is realized. Intensifiers are generally used in an amount of from about 0.10 to 10 weight parts per weight part of color former and about 0.50 to 4.0 parts is preferred. More than 10 parts per part of color former is not recommended except when the color former and the intensifier are in separate layers.

The color formers of this invention are derivatives of $[\Delta_{2,2'}$-Biindoline]-3,3'-dione, commonly known as indigo. The derivatives are commonly known as dehydroindigo di(alkyl acylates) and bear the proper chemical name of 2,2'-diacyloxy-2,2'-biindoline-3,3'-dione. Indigo is a colored dye and is not thermally colorable. Unmodified dehydroindigo compounds are thermally colorable and develop from nearly colorless through yellow and green to blue at less than 25° C. Moreover, such dehydroindigo compounds are very sensitive to humidity changes and tend to develop color in humid environments.

Eligible dehydroindigo color former compounds are symmetrical diesters having increasing carbon numbers from propionate through heptylate and octylate. The diester functionality reduces the coloration tendency and raises the coloration temperature to provide eminently effective thermal sensitive material. The color former is generally associated with the substrate in an amount of about 0.3 to 0.7 grams of color former per square meter of substrate surface area. As little as 0.1 grams per square meter can be used and more than 1.5 grams per square meter might be required or desired in some instances. A larger amount of color former might be required where the effect of an intensifier is desired and the color former and intensifier are in separate layers.

DESCRIPTION OF PREFERRED EMBODIMENTS

All parts are weight parts and all percents are weight percents, unless otherwise specified.

EXAMPLE 1

0.05 parts of dehydroindigo dihexanoate is dissolved in 4.0 parts of a solution of 10 percent polystyrene in toluene to make a thermal sensitive liquid binder system with color former. The binder system is coated onto a polyester film substrate to a wet film thickness of about 10 millimeters. A dried sheet of the above-made material undergoes coloration in areas where the temperature is increased to about 170° C.

The Example is also conducted using paper and cellulose acetate as substrates and polycarbonate and styrene-acrylonitrile copolymer as binders.

EXAMPLES 2–7

Example 1 is repeated substituting each of the several color formers specified below for the color former of Example 1; and with and without 0.05 parts of 2,3-dihydroxynaphthalene (DHN). An excellent color forming thermal sensitive recording material is formed. The DHN is used as an intensifier. Examples incorporating DHN are imaged by exposure in any commercially available heat copying machine.

| | | Coloration Temperature (° C) | |
|---|---|---|---|
| Example | Di(alkyl acylate) | with DHN | without DHN |
| 2 | acetate | forms no color | 230 (decomposes) |

-continued

| Example | Di(alkyl acylate) | Coloration Temperature (° C) with DHN | without DHN |
|---|---|---|---|
| 3 | propionate | 117 | 222 |
| 4 | 2-methyl propionate (butyrate) | 111 | 185 |
| 5 | 2-ethylhexanoate (octanoate) | 97 | 173 |
| 6 | hexanoate | 99 | 183 |
| 7 | heptanoate | 92 | 175 |

The indicated coloration temperatures, without DHN, are actually melting points of the corresponding di(alkyl acylate) compounds. Without DHN, color can be expected to form at about 30° to 40° C. below the melting points. Note that the diacetate forms no color with DHN and that it decomposes at about 230° C., without DHN.

EXAMPLE 8

0.10 parts of dehydroindigo diheptanoate is dissolved in 10 parts of a solution of 7.0 percent cellulose acetate butyrate and 1.0 percent d-10-camphorsulfonic acid in toluene:butanol:ethanol 80:10:10 to make a liquid binder system. The binder system is cast onto a silicone-coated, stainless steel, plate to a wet thickness of about 10 millimeters and dried. The sheet is removed from the plate and is used as a transparent thermal sensitive copying material useful, among other things, as a transparency in overhead light projection.

The sulfonic acid serves as an intensifier. Other eligible sulfonic acids include:

catechol-3,5-disulfonic acid;
2-chloroaniline-5-sulfonic acid;
2-chloro-6-methylaniline-4-sulfonic acid;
4-chloroaniline-3-sulfonic acid;
m-benzenedisulfonic acid;
p-chlorobenzene sulfonic acid;
2-naphthalenesulfonic acid;
xylenesulfonic acid;
toluenesulfonic acid;
4-nitrotoluene-2-sulfonic acid;
2,4,6-trinitrobenzenesulfonic acid; and
2,4-dinitro-1-naphthol-7-sulfonic acid and the like.

EXAMPLES 9–41

Example 1 is repeated and 0.05 parts of a variety of phenol intensifiers is added to the thermal sensitive binder system. Each thermal sensitive material is coated onto a substrate and dried. The dried thermal sensitive material is sometimes slightly colored but is usually nearly colorless and, in every case, develops color at a characteristic temperature. Particulars of these examples are listed following:

| Example | Intensifier | Initial Color | Developed Color |
|---|---|---|---|
| 9 | bis-(2-hydroxyphenyl)methane | light green | blue |
| 10 | 6,6'-isobutylene-bis-2,4'-xylenol | nearly colorless | blue |
| 11 | 2,7-dihydroxynaphthalene | light green | blue |
| 12 | catechol | green | dense blue |
| 13 | 2,2'-methyl-bis(4,6-di-tertbutylcresol) | colorless | blue |
| 14 | p-tritylphenol | colorless | blue |
| 15 | 6,6'-methylene-bis(4-tert-butyl-o-cresol) | green | blue |
| 16 | 2,2'-methylene-bis(6-tert-butyl-4-chlorophenol) | light green | blue |
| 17 | p-nitrophenol | yellow | green |
| 18 | phenol | colorless | dark blue |
| 19 | 2,4,6-trimethylphenol | green | blue |
| 20 | 2,2'-methylene-bis(4-chlorophenol) | nearly colorless | blue |
| 21 | p-tertbutylphenol | colorless | blue |
| 22 | 2,4,6-tri-tertbutylphenol | nearly colorless | purple |
| 23 | m-pentadecylphenol | colorless | dark blue |
| 24 | 3-methyl-4-nitrophenol | colorless | blue-green |
| 25 | 2-methyl-4-tertoctylphenol | light green | dark blue |
| 26 | 2,2'-methylene-bis(6-tert-butyl-4-ethylphenol) | green | dark purple |
| 27 | m-nitrophenol | colorless | blue-green |
| 28 | 4-chloro-2-methylphenol | nearly colorless | blue |
| 29 | p-methoxyphenol | blue-green | blue |
| 30 | p-bromophenol | colorless | blue |
| 31 | 2-methylene-bis(4-chloro-6-methylphenol) | light green | blue |
| 32 | o-hydroxybiphenyl | colorless | dark blue |
| 33 | 4-iodophenol | colorless | blue |
| 34 | 4,4'-methylene-bis(2-tert-butyl-6-methylphenol) | light green | dark green |
| 35 | p-(1,1-dimethylpropyl)phenol | nearly colorless | blue |
| 36 | 2,6-dichlorophenol | light green | dark blue |
| 37 | 4,4'-isopropylidene-bis(2-isopropylphenol) | light green | dark blue |
| 38 | p-p'-(p-phenylenediisopropylidene)diphenol | colorless | dark blue |
| 39 | 4,4,6,6-tetratertbutyl-o,o-bisphenol | light green | purple |
| 40 | 4,4'-isopropylidene-bis(6-chloro-o-cresol) | colorless | blue |
| 41 | 4,4'-isopropylidene-di-o- | light green | blue |

| Example | Intensifier | Initial Color | Developed Color |
|---|---|---|---|
| | cresol | | |

EXAMPLE 42

0.2 parts of finely powdered dehydroindigo dihexanoate and 0.4 parts of finely powdered p-tert-butylphenol, intensifier, are thoroughly dispersed in a 5.0 percent solution of polyvinyl alcohol in water to yield a thermal sensitive liquid binder system. Ethylhydroxyethylcellulose is also an eligible binder. That dispersion is coated onto a substrate and cast onto a silicone-coated sheet, as in previous examples, to make opaque and translucent thermal sensitive recording material.

EXAMPLE 43

Dehydroindigo di(alkyl acylates) are prepared as follows: Indigo is reacted with an appropriate carboxylic acid in the presence of a catalyst such as lead tetracetate. As a preferred method, the carboxylic acid is in excess and can be used as the vehicle in which to conduct the reaction.

For instance, in making dehydroindigo dipropionate, about 0.01 mole of indigo (2.6 grams) and about 0.01 mole of lead tetracetate (4.7 grams) are stirred into about 100 grams of propionic acid. Agitation is continued for about 15 to 30 minutes and, if desired or required, the mixture can be warmed to maintain fluidity of the system.

As it is formed, the dipropionate product precipitates from solution in the propionic acid. The product is separated by filtration, washed with water to remove residual components, and purified by recrystallization from benzene or toluene.

Others of the di(alkyl acylate compounds are made in similar fashion using appropriate carboxylic acids. The melting points of representative compounds have been listed in Examples 2-7, above.

What is claimed is:

1. Dehydroindigo di(alkyl acylate) having the following structure wherein R is alkyl acylate having three to nine carbon atoms:

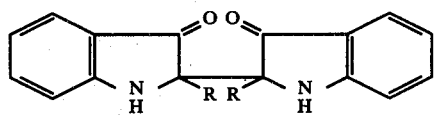

2. The dehydroindigo di(alkyl acylate) of claim 1 wherein R is hexanoate.

* * * * *